United States Patent [19]

Ty

[11] 4,414,286
[45] Nov. 8, 1983

[54] COMPOSITE THERMOSTAT METAL

[75] Inventor: Henry Ty, Attleboro, Mass.

[73] Assignee: Texas Instruments Incorporated, Dallas, Tex.

[21] Appl. No.: 267,144

[22] Filed: May 26, 1981

Related U.S. Application Data

[63] Continuation-in-part of Ser. No. 250,358, Apr. 2, 1981, abandoned.

[51] Int. Cl.³ .............................................. B32B 15/18
[52] U.S. Cl. ............................... 428/616; 148/11.5 Q; 228/235; 428/617; 428/619; 428/685; 428/940; 428/679
[58] Field of Search ................... 148/11.5 Q; 228/235; 428/616–619, 678–685, 940

[56] References Cited

U.S. PATENT DOCUMENTS

| | | | |
|---|---|---|---|
| 2,403,895 | 7/1946 | Alban et al. | 428/618 |
| 2,461,518 | 2/1949 | Chace | 29/195.5 |
| 3,219,423 | 11/1965 | Sears et al. | 428/618 |
| 3,829,296 | 8/1974 | Charest et al. | 428/617 |
| 3,849,079 | 11/1974 | Montuelle et al. | 428/663 |
| 3,871,926 | 3/1975 | Steigelman | 148/127 |
| 4,131,720 | 12/1978 | Spengler | 428/619 |
| 4,366,210 | 12/1982 | Golemo, Jr. | 428/685 |

FOREIGN PATENT DOCUMENTS

| | | | |
|---|---|---|---|
| 543290 | 7/1957 | Canada | 228/619 |
| 1164686 | 2/1966 | France | 228/616 |
| 1444063 | 7/1976 | United Kingdom | 228/235 |

OTHER PUBLICATIONS

Peckner, D. et al., *Handbook of Stainless Steels*, McGraw Hill Book Co., pp. 1-6 to 9, 4-28 to 35, 12-22 to 26, 19-2 and 3, A1-54 and 55 (1977).

"Thermostat Metals" Product Bulletin, Texas Instruments Incorporated, Bull. 515-7B16-268.
"The Making, Shaping and Testing of Steel", United States Steel, printed by Herbick & Held, Pittsburgh, Pa., 1971, p. 1174.

Primary Examiner—Michael L. Lewis
Attorney, Agent, or Firm—James P. McAndrews; John A. Haug; Melvin Sharp

[57] ABSTRACT

A composite thermostat metal having layers of metal of relatively high and relatively low coefficients of thermal expansion metallurgically bonded together has a relatively thin, corrosion-resistant layer of an austenitic stainless steel metallurgically bonded to the low expansion side of the thermostat metal, the stainless steel material being selected from the group consisting of austenitic stainless steels which undergo austenite to martensite transformation and concomitant lowering of coefficient of thermal expansion during work hardening. The stainless steel material is work hardened to a selected extent for lowering its coefficient of thermal expansion so that it cooperates with the other components of the thermostat metal in providing the thermostat metal with suitably high flexivity while also providing improved corrosion-resistance properties on the low expansion side of the thermostat metal. In one embodiment, the thermostat metal embodies a second layer of austenitic stainless steel at the opposite or high expansion side of the thermostat metal, the second layer material being selected from the group consisting of austenitic stainless steels which are characterized by relatively high coefficient of thermal expansion and are substantially free of austenite to martensite transformation during work hardening, whereby the second layer also cooperates in achieving a desired high flexivity while providing corrosion resistance properties for the high expansion side of the thermostat metal.

13 Claims, 6 Drawing Figures

COMPOSITE THERMOSTAT METAL

This application is a continuation-in-part of the commonly assigned, copending application Ser. No. 250,358 of the present inventor filed Apr. 2, 1981 now abandoned.

BACKGROUND OF THE INVENTION

The field of this invention is that of thermostat metals and the invention relates more particularly to low cost, high flexivity thermostat metals particularly adapted for use in corrosive environments.

Thermostat metals basically comprise a layer of metal of relatively high coefficient of thermal expansion bonded to a layer of metal of relatively lower coefficient of thermal expansion so that the resulting composite materials flex in response to temperature change. Such thermostat metals have previously incorporated stainless steel materials for various purposes and have used stainless steels as well as other metal claddings or platings for providing the thermostat metals with corrosion resistance properties.

In that regard, commercially available austenitic stainless steels are known to have particularly desirable corrosion resistance properties. They have also been generally considered to have relatively high coefficients of thermal expansion. Accordingly, they have been used the high expansion sides of thermostat metals where their high expansion properties have been intended to cooperate with the characteristics of the other metal layers in the composites to provide the thermostat metals with high flexivity while the iron-chromium-nickel alloys of the austenitic stainless steels have provided excellent corrosion protection for the high expansion side of the thermostat metals.

Usually materials other than stainless steels such as invar or the like have been used as the low expansion materials in composite thermostat metals and, when additional corrosion resistance properties have been required on the outer surface of the low expansion sides of thermostat metals, some difficulty has been encountered. For example, where thin stainless steels have been used for protecting the low expansion sides of the thermostat metal against corrosion, ferritic stainless steels have been used. The iron-chromium alloys of the ferritic stainless steels are known to provide less substantial corrosion resistance properties than austenitic stainless steels and usually require processing in controlled neutral or reducing atmospheres. Use of such ferritic materials also tend to involve some parts manufacturing problems or parts welding problems due to the occurrence of chromium oxides in the ferritic stainless steels which can interfere with welding or cause an undesirable degree of tool wear. If ferritic stainless steels with titanium contents are selected to improve weldability, the occurrence of titanium oxides also tend to cause undesirable tool wear. However, the ferritic steels are used because they are generally considered to have significantly lower coefficients of thermal expansion. Thus, the ferritic materials have been used because they had been considered to have restricted effect in limiting thermostat metal flexivity even though their corrosion resistance properties and processing requirements have been less than fully desirable.

SUMMARY OF THE INVENTION

It is an object of this invention to provide a novel and improved thermostat metal which is particularly adapted for use in corrosive environments; to provide such a thermostat metal which utilizes well known, relatively low cost, commercially available layer materials; to provide such a thermostat metal which achieves suitably high flexivity while providing improved corrosion resistance properties; and to provide such a thermostat metal which is adapted to be easily and economically processed.

Briefly described, the novel and improved thermostat metal of this invention comprises first metal layer means of relatively high coefficient of thermal expansion which are metallurgically bonded in any conventional manner to second metal layer means of relatively lower coefficient of thermal expansion so that the resulting composite thermostat metal material flexes to a selected extent in response to selected temperature change. In accordance with this invention, the second metal layer means includes at least one relatively thin outer layer component of austenitic stainless steel material selected from the group consisting of metastable austenitic stainless steels which are subject to significant austenite to martensite transformation and concomitant reduction in coefficient of thermal expasion during work hardening thereof. The stainless steel layer is metallurgically bonded to other layer components of the composite thermostat metal by conventional roll bonding or the like so that the thin layer is placed in a selected, work-hardened condition for lowering the coefficient of thermal expansion of the material to a selected extent and so that the metal layer is disposed on the outer surface of the low expansion side of the composite thermostat metal. In that arrangement, the relatively thin austenitic stainless steel material cooperates with other layer components of the thermostat metal in achieving a suitably high composite thermostat metal flexivity while also providing the low expansion side of the thermostat metal with improved corrosion resistance properties. It also permits that desirable degree of corrosion resistance to be achieved in an economical manner without requiring special processing of the composite material in controlled neutral or reducing atmospheres or the like.

In one preferred embodiment of the invention, the composite thermostat metal embodies a first layer of metal of relatively high coefficient of thermal expansion metallurgically bonded to one side of a second layer of metal of relatively low coefficient of thermal expansion while the thin metastable austenitic stainless steel layer, preferably comprising about 5 percent of the total thickness of the composite metal, is metallurgically bonded to the opposite side of the second metal layer to provide desired corrosion resistance properties at the low expansion side of the thermostat metal. If desired, the first metal layer at the high expansion side of the thermostat metal is formed of a stable austenitic stainless steel material which is substantially free of transformation during work hardening. The stable austenitic stainless steel material has a relatively high coefficient of thermal expansion and in that arrangement it cooperates with the other layer components of the thermostat metal in providing a desired high flexivity while also providing corrosion-resistance properties at the high expansion side of the thermostat metal. It also permits both stainless steel materials to be processed in the same manner.

In another preferred embodiment, the composite thermostat metal has at least four metal layers comprising a first layer of metal of relatively high coefficient of thermal expansion having a thin, second layer of stable austenitic stainless steel material bonded to one side of the first layer. The second layer material also displays a relatively high coefficient of thermal expansion and is selected to be from the group of stainless steels which are substantially free of transformation during work hardening. A third layer of metals of relatively low coefficient of thermal expansion has one side thereof metallurgically bonded to the opposite side of the first metal layer, and a relatively thin fourth layer of a metastable austenitic stainless steel material is metallurgically bonded to the opposite side of the third layer. The fourth metal layer is bonded to the third metal layer by roll bonding or the like so that it is placed in a selected condition of work hardening and so that its coefficient of thermal expansion is substantially lowered by such work hardening. In that arrangement, the composite thermostat metal displays suitably high flexivity, embodies low cost and readily available materials, has improved corrosion-resistance properties at both the high and low expansion sides of the thermostat metal, and does not require use of any controlled neutral or reducing atmospheres in processing the thermostat metal.

In another preferred embodiment, the composite thermostat metal has only two layers, the first layer comprising a layer of stable austenitic stainless steel having a relatively high coefficient of thermal expansion which is selected from the group of stainless steels which are substantially free of transformation during work-hardening. The first layer is metallurgically bonded to a second layer comprising a metastable austenitic stainless steel which is placed in a condition of work-hardening by roll-bonding or the like so that its coefficient of thermal expansion is relatively lower than that of the metal in the first layer, whereby the composite thermostat metal displays a selected degree of flexivity, embodies low cost materials, is corrosion resistant, is readily weldable, and is easily manufactured into thermostat metal parts with reduced tendency to cause tool wear.

BRIEF DESCRIPTION OF THE DRAWINGS

Other objects, advantages and details of the novel and improved thermostat metal of this invention appear in the following detailed description of preferred embodiments of the invention, the detailed description referring to the drawings in which.

DESCRIPTION OF THE PREFERRED EMBODIMENTS

Figure 1:
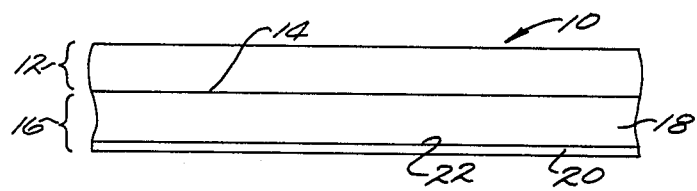
FIG. 1 is a side elevation view to greatly enlarged scale of one preferred embodiment of the composite thermostat metal of this invention.

Referring to the drawings, 10 in FIG. 1 indicates one preferred embodiment of the novel and improved composite thermostat metal of this invention which is shown to include first metal layer means 12 of relatively high thermal expansion properties metallurgically bonded along interface 14 to second metal layer means 16 of relatively lower thermal expansion properties so that the composite material 10 is adapted to flex to a selected extent in response to selected temperature change.

In accordance with this invention, the second metal layer means 16 includes one metal layer component 18 formed of a metal material of relatively low coefficient of thermal expansion and also includes an additional, relatively thin metal component 20 formed of a metastable austenitic stainless steel selected from the group consisting of austenitic stainless steels which are subject to significant austenite to martensite transformation and concomitant lowering of its coefficient of thermal expansion in response to work hardening at or near room temperature. The metal layer 20 is bonded to the layer 18 along interface 22 and is placed in a selected work-hardened condition in any conventional manner by roll bonding or the like so that the coefficient of thermal expansion of the layer material is lowered to a selected extent. In that arrangement, the thermal expansion properties of the layer component 20 more nearly correspond to the thermal expansion properties of the low expansion material of layer 18 so that the layer 20 cooperates with the expansion properties of the other metal layers in the composite material 10 to provide the composite thermostat metal with the suitably high flexivity while the component 20 also serves to provide the thermostat metal with improved corrosion resistance properties on the low expansion side of the thermostat metal.

Figure 3:
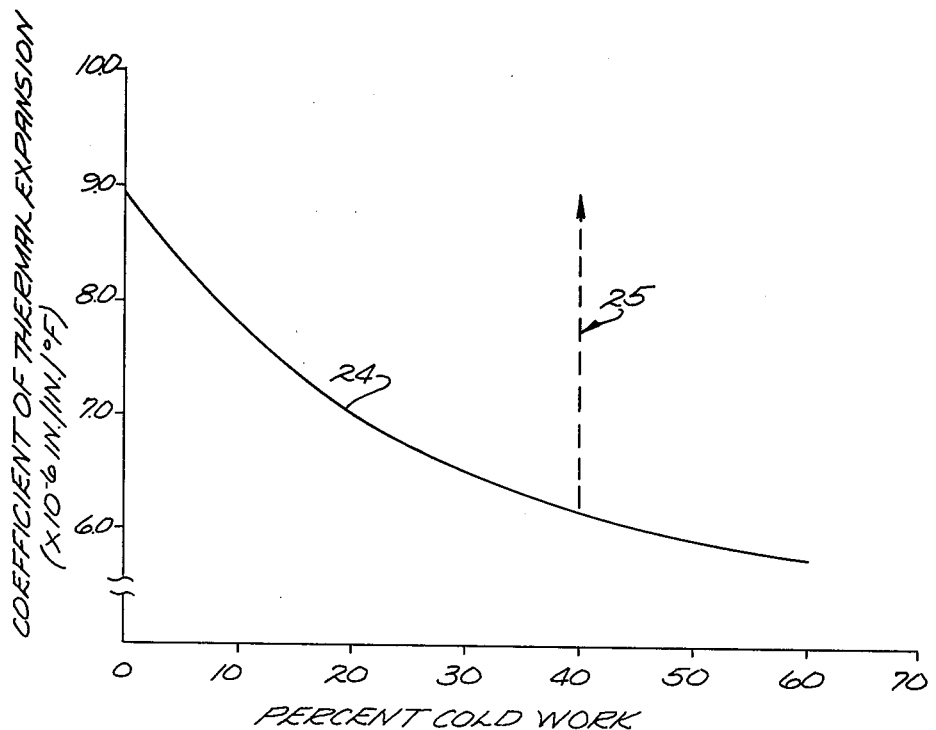
FIG. 3 is a graph illustrating properties of a metastable austenitic stainless steel used in the thermostat metals of this invention.

In this regard, it is well known that the iron-chromium-nickel systems of conventional austenitic stainless steels provide corrosion resistance properties which are superior to those of ferritic stainless steels and the like for most purposes. The austenitic stainless steels are also generally considered to display relatively higher coefficients of thermal expansion. Typically for example, they are characterized as having thermal expansion coefficients on the order of $9.0 \times 10^{-6}$ in./in./°F. in the temperature range from about 50° to 200° F. It is also known that some of the conventional austenitic stainless steels are metastable and undergo a partial but significant degree of austenite to martensite transformation under plastic deformation at or near room temperature. That is, the austenitic stainless steels are known to be characterized by relatively rapid work hardening. It has now been recognized that with such hardening by cold working or the like there is a concomitant lowering of the coefficient of thermal expansion of the noted materials and that, when such metastable austenitic stainless steels are placed in a selected work-hardened condition as a protective layer over a low expansion metal on the low expansion side of a thermostat metal, the metastable material provides improved corrosion protection while also achieving a new and advantageous cooperation with the other layer components of the thermostat metal in providing the metal with a suitably high degree of material flexivity. For example, as shown by curve 24 in FIG. 3, when the austenitic stainless steel commonly called 301 Stainless Steel is subjected to rolling reduction in its thickness at or near room temperature, the coefficient of thermal expansion of the material is reduced from about $9.0 \times 10^{-6}$ in./in./°F. (in annealed or unworked condition) to about $6.0 \times 10^{-6}$ in./in./°F. when the material has been reduced in thickness about 60 percent. As indicated by the arrow 25 in FIG. 3, the original thermal expansion characteristic of the material is restored when the material is subjected to conventional annealing and is adapted to again be lowered when the material is again work hardened by subsequent, further reduction in material thickness.

In the preferred embodiment 10 of this invention, the first metal layer means 12 is formed of any of the metal layer materials of relatively high coefficient of thermal expansion which are conventionally employed in composite thermostat metals. Typically for example, the metal layer means 12 is selected from the group of high thermal expansion alloys as set forth in Table IA (below) within the scope of this invention:

forth in Table IB (below) within the scope of this invention:

TABLE I B

| SAE Number | Nickel | Chromium | Carbon max. | Manganese max. | Silicon max. | Phosphorous max. | Sulfer max. | Other Elements | Iron | AISI Type Number |
|---|---|---|---|---|---|---|---|---|---|---|
| 30305 | 10.00–13.00 | 17.00–19.00 | 0.12 | 2.00 | 1.00 | 0.045 | 0.030 | — | Bal. | 305 |
| 30308 | 10.00–12.00 | 19.00–21.00 | 0.08 | 2.00 | 1.00 | 0.045 | 0.030 | — | Bal. | 308 |
| 30309 | 12.00–15.00 | 22.00–24.00 | 0.20 | 2.00 | 1.00 | 0.045 | 0.030 | — | Bal. | 309 |
| 30309S | 12.00–15.00 | 22.00–24.00 | 0.08 | 2.00 | 1.00 | 0.045 | 0.030 | — | Bal. | 309S |
| 30310 | 19.00–22.00 | 24.00–26.00 | 0.25 | 2.00 | 1.50 | 0.045 | 0.030 | — | Bal. | 310 |
| 30310S | 19.00–22.00 | 24.00–26.00 | 0.08 | 2.00 | 1.50 | 0.045 | 0.030 | — | Bal. | 310S |
| 30314 | 19.00–22.00 | 23.00–26.00 | 0.25 | 2.00 | 1.50–3.00 | 0.045 | 0.030 | — | Bal. | 314 |
| 30316 | 10.00–14.00 | 16.00–18.00 | 0.08 | 2.00 | 1.00 | 0.045 | 0.030 | Mo,2.00–3.00 | Bal. | 316 |
| 30316L | 10.00–14.00 | 16.00–18.00 | 0.03 | 2.00 | 1.00 | 0.045 | 0.030 | Mo,2.00–3.00 | Bal. | 316L |
| 30317 | 11.00–15.00 | 18.00–20.00 | 0.08 | 2.00 | 1.00 | 0.045 | 0.030 | Mo,3.00–4.00 | Bal. | 317 |
| 30321 | 9.00–12.00 | 17.00–19.00 | 0.08 | 2.00 | 1.00 | 0.045 | 0.030 | Ti,5 × C min. | Bal. | 321 |
| 30330 | 33.0–37.0 | 14.00–17.00 | 0.15 | 2.00 | 1.50 | 0.045 | 0.04 | — | Bal. | — |
| 30347 | 9.00–13.00 | 17.00–19.00 | 0.08 | 2.00 | 1.00 | 0.045 | 0.030 | Cb—Ta, 10 × C min. | Bal. | 347 |
| 30348 | 9.00–13.00 | 17.00–19.00 | 0.08 | 2.00 | 1.00 | 0.045 | 0.030 | Cb—Ta, 10 × C min.; Ta,0.10 max. | Bal. | 348 |

*The following compositions can be sufficiently free of transformation for use on the high expansion side of the thermostat metal if there are sufficiently high nickel contents in the particular melts:

| 30304 | 8.00–12.00 | 18.00–20.00 | 0.08 | 2.00 | 1.00 | 0.045 | 0.030 | — | Bal. | 304 |
| 30304L | 8.00–12.00 | 18.00–20.00 | 0.03 | 2.00 | 1.00 | 0.045 | 0.030 | — | Bal. | 304L |

In the preferred embodiment 10 of this invention, the low expansion metal layer component 18 incorporated in second metal layer means 16 is formed of any of the metal layer means of relatively low coefficient of thermal expansion which are conventionally employed in composite thermostat metals. Typically for example, the metal layer 18 is selected from the group of low expansion alloys as set forth in Table II (below) within the scope of this invention:

TABLE II

| Alloy | Nickel | Chromium | Aluminum | Molybdenum | Cobalt | Iron |
|---|---|---|---|---|---|---|
| 10 | 36 | — | — | — | — | Bal. |
| 11 | 38.65 | — | — | — | — | Bal. |
| 12 | 31 | 8 | — | — | 8 | Bal. |
| 13 | 32 | — | — | 1 | 15 | Bal. |
| 14 | 38 | 7 | — | — | — | Bal. |

TABLE I A

| Alloy | Nickel | Chromium | Carbon | Manganese | Aluminum | Molybdenum | Copper | Silicon | Zinc | Cobalt | Iron |
|---|---|---|---|---|---|---|---|---|---|---|---|
| A | — | — | — | — | — | — | 62 | — | 38 | — | — |
| B | 22 | 3 | — | — | — | — | — | — | — | — | Bal. |
| C | 19.4 | 2.25 | 0.5 | — | — | — | — | — | — | — | Bal. |
| D | 14.65 | — | — | 9.5 | 5.1 | — | — | — | — | — | Bal. |
| E | 25 | 8.5 | — | — | — | — | — | — | — | — | Bal. |
| G | 18 | 11.5 | — | — | — | — | — | — | — | — | Bal. |
| GA | 18 | 10 | — | — | — | 3.0 | — | — | — | — | Bal. |
| GB | 19 | 7 | — | — | — | — | — | — | — | — | Bal. |
| H | 14 | — | 0.5 | 5 | — | — | — | — | — | — | Bal. |
| J | — | — | — | 0.3 | — | — | Bal. | 1.5 | — | — | — |
| L | 25 | — | — | 4 | — | — | — | — | — | — | Bal. |
| P | 10 | — | — | 72 | — | — | 18 | — | — | — | — |
| R | 66.5 | — | — | 1.0 | — | — | 31 | — | — | — | 1.5 |
| 15 | 32 | — | — | — | — | — | — | — | — | 1 | Bal. |
| 20 | 40 | — | — | — | — | — | — | — | — | — | Bal. |
| 30 | 42 | — | — | — | — | — | — | — | — | — | Bal. |
| 40 | 45 | — | — | — | — | — | — | — | — | — | Bal. |
| 50 | 50 | — | — | — | — | — | — | — | — | — | Bal. |
| 70 | — | 17 | — | — | — | — | — | — | — | — | Bal. |
| 71 | — | 16.5 | — | — | 4.5 | — | — | — | — | — | Bal. |
| 80 | — | 9 | — | — | — | — | — | — | — | 57 | Bal. |

Alternately, the metal layer means 12 is selected from a group of austenitic stainless steel materials which are stable and substantially free of austenite to martensite transformation during work hardening and which are characterized by having relatively high coefficients of thermal expansion. Such austenitic stainless steels include many of the materials in the groups commonly called 200 and 300 Series Stainless Steels which are designated as 30 200 Series Stainless Steels and 30 300 Series Stainless Steels by the American Society of Automotive Engineers and as 200 and 300 Series Stainless Steels by the American Iron and Steel Institute as set In the preferred embodiment 10 of this invention, the metal layer component 20 of the second layer means 16 is formed of the austenitic stainless steel materials which are subject to significant austenite to martensite transformation and to significant, concomitant lowering of coefficient of thermal expansion in response to work hardening at or near room temperature. Typically, for example, the metal layer component 20 is selected from the group consisting of the metastable austenite stainless steel designated as 30 201, 30 301 and 30 302 Stainless Steels by the American Society of Automotive Engineers and as 201, 301 and 302 Stainless Steels by the American Iron and Steel Institute as set forth in Table III (below) within the scope of this invention:

TABLE III

| SAE Number | Nickel | Chromium | Carbon max. | Manganese max. | Silicon max. | Phosphorous max. | Sulfer max. | Other Elements | Iron | AISI Type Number |
|---|---|---|---|---|---|---|---|---|---|---|
| 30201 | 3.50–5.0 | 16.00–18.00 | 0.15 | 5.5–7.5 | 1.00 | 0.060 | 0.030 | N,0.25 max. | Bal. | 201 |
| 30301 | 6.00–8.00 | 16.00–18.00 | 0.15 | 2.00 | 1.00 | 0.045 | 0.030 | — | Bal. | 310 |
| 30302 | 8.00–10.00 | 17.00–19.00 | 0.15 | 2.00 | 1.00 | 0.045 | 0.030 | — | Bal. | 302 |
| *The following compositions can be sufficient transformation for use on the low expansion side of the thermostat metal if there are sufficiently low nickel contents in the particular melts: | | | | | | | | | | |
| 30304 | 8.00–12.00 | 18.00–20.00 | 0.08 | 2.00 | 1.00 | 0.045 | 0.030 | — | Bal. | 304 |
| 30304L | 8.00–12.00 | 18.00–20.00 | 0.03 | 2.00 | 1.00 | 0.045 | 0.030 | — | Bal. | 304L |

In accordance with this invention, the composite thermostat metal 10 is preferably formed in any conventional manner wherein the metal layers 12 and 18 are metallurgically bonded to each other on interface 14 and the metal layer 20 is metallurgically bonded to the layer 18 along the interface 22 using conventional roll bonding methods and the like such as are commonly used in making composite thermostat metals. Preferably, the thickness of the metal layer 20 is selected to be at least about 5 percent of the total thickness of the composite material 10 so that, when the composite material is reduced to the desired thickness for use, the thickness of the metal layer 20 is sufficient to provide substantial corrosion protection for the low expansion material of the metal layer 18 in the environment of its intended use. On the other hand, the thickness of layer 20 is desirably kept relatively small so that the flexivity of the composite material 10 is not substantially reduced by the presence of the layer 20 on the outer surface of the low expansion side of the composite. The relative thicknesses of the other metal layers 12 and 18 are selected to provide the composite material 10 with the desired flexivity and conventional manner. Preferably, the materials of the metal layers and the layer thicknesses are selected to provide the composite material 10 with the flexivity of at least about $100 \times 10^{-7}$ in./in./°F. (as determined by the American Society for Testing Materials) and most desirably the flexivity is at least about $110 \times 10^{-7}$ in./in./°F.

EXAMPLE I

In one preferred embodiment of the composite thermostat metal 10, where the metal layer 12 is formed of 305 Stainless Steel as shown in Table I B, the metal layer 18 is formed of alloy 10 as shown in Table II, and the layer 20 is formed of 301 Stainless Steel as shown in Table III, where the metal layers have a relative thickness of 47.5 percent, 47.5 percent, and 5 percent respectively of the total thickness of the composite thermostat metal 10, and where the composite material is processed by rolling reduction in thickness and the like so that the material of the composite metal layer 20 is in significantly work hardened condition corresponding to 40 percent reduction in thickness of the layer material, the composite metal would have excellent corrosion resistance properties and displays a flexivity of $108 \times 10^{-7}$ in./in./°F. in the temperature range from about 50° to 200° F. Corresponding results are achieved when a particular high nickel metal of 304 Stainless Steel is substituted for 305 Stainless Steel noted above and/or when 302 Stainless Steel is substituted for the 301 Stainless Steel as noted above.

Of course the composite material 10 is adapted to be provided with other flexivities by substituting any of the metal materials from Tables I A and II for the high and low expansion materials specified in the example above. It should also be understood that other material layers are adapted to be employed between the metal layers 12 and 18 for improving strength or electrical conductivity or the like or for improving bonding between the metal layers 12 and 18 in any conventional manner within the scope of this invention.

Figure 2:
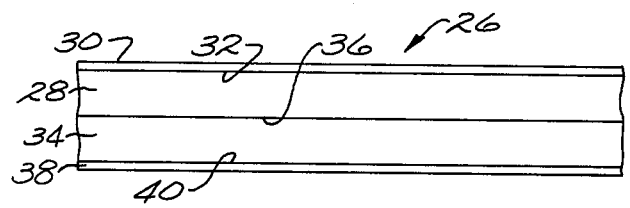
FIG. 2 is a side elevation view similar to FIG. 1 illustrating another preferred embodiment of the composite thermostat metal of this invention.

In another preferred embodiment as shown in FIG. 2, the composite thermostat metal 26 of this invention embodies at least four layers of metal. That is, a first layer 28 of metal of relatively high coefficient of thermal expansion has a second layer 30 of a corrosion resistant austenitic stainless steel material metallurgically bonded to one side of the first layer along the interface 32, the stainless steel material of the layer 30 being selected from the group consisting of austenitic stainless steels which are substantially free of transformation during work hardening thereof. Typically for example, the material of layer 28 is selected from the materials in Table I A and the material of layer 30 is one of the steels selected from Table I B. A third layer 34 of metal of relatively lower coefficient of thermal expansion has one side thereof metallurgically bonded to the opposite side of the first layer 28 along interface 36 and a fourth layer 38 of a corrosion resistant austenitic stainless steel is metallurgically bonded to the opposite side of the third layer along interface 40, the fourth layer being selected from the group consisting of austenitic stainless steels which undergo significant austenite to martensite transformation and concomitant lowering of thermal expansion during work hardening thereof. Typically for example, the material of layer 34 is selected from the materials of Table I while the material of layer 38 is selected from the metals listed in Table III. The metal layers are metallurgically bonded to each other by pressure roll bonding or the like in any conventional manner so that the material of the metal layer 38 is placed in a selected condition of work-hardening for lowering its coefficient of thermal expansion to a selected level. The metal layers 30 and 38 are also made relatively very thin so that the flexivity of the thermostat metal 26 is determined primarily by the thermal expansion properties of the metal layers 28 and 34 as will be understood. However, the metal layers 30 and 38 are made thick enough, preferably each comprising about 5 to 10 percent of the total thickness of the composite material 26, for providing the thermostat metal with excellent corrosion resistance properties on both the high and low expansion sides of the thermostat metal. In that arrangement, the materials of metal layers 28 and 34 are adapted to be selected to achieve a desired high level of flexivity in the thermostat metal while the metal materials of layers 30 and 38 are selected to cooperate in achieving that high flexivity, in providing excellent corrosion resistance, and in permitting the composite thermostat metal to be processed more easily without requiring special atmospheres to protect the outer layer materials during processing.

EXAMPLE II

Figure 4:
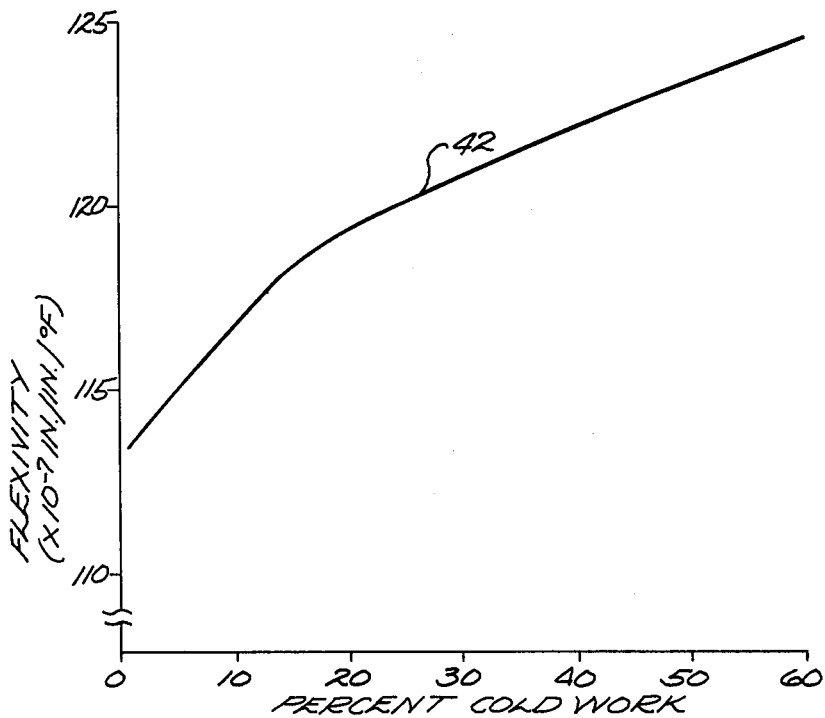
FIG. 4 is a graph illustrating properties of a composite thermostat metal as provided by this invention.

In one preferred embodiment of the composite thermostat metal 26 of this invention, the metal layer 28 is formed of Alloy B as shown in Table I A, metal layer 30 is formed of 305 Stainless Steel as shown in Table I B, metal layer 34 is formed of Alloy 10 as shown in Table II, and metal layer 18 is formed of 301 Stainless Steel as shown in Table III, the metal layers having thicknesses comprising 5 percent, 45 percent, 45 percent, and 5 percent respectively of the total thickness of the composite material 26. When that composite material is processed by rolling reduction in thickness or the like in conventional manner so that the metal material of layer 38 (as well as the materials of the other layers) are placed in work hardened condition corresponding to reduction in thickness of layer 38 up to 60 percent of its thickness, as indicated by curve 42 in FIG. 4, the flexivity of the composite thermostat metal increases from about $115 \times 10^{-7}$ in./in./°F. to about $124 \times 10^{-7}$ in./in./°F., a substantial improvement in a product also characterized by excellent corrosion resistance properties. Again it should be understood that the composite material 26 can incorporate additional metal layers between the layers shown for improving strength, electrical conductivity or bondability in conventional manner within the scope of this invention.

Figure 5:
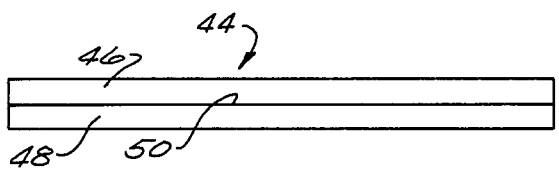
FIGS. 5 and 6 illustrate other alternate embodiments of the thermostat metal of this invention.

In another preferred embodiment as shown in FIG. 5, the composite thermostat metal 44 of this invention embodies only two layers of metal. That is, a first layer 46 of metal of relatively high coefficient of thermal expansion is formed of a material such as a corrosion resistant austenitic stainless steel material selected from the group consisting of austenitic stainless steels which are substantially free of transformation during work hardening thereof. Typically for example, the material of layer 46 is selected from the materials in Table I A or one of the stainless steels selected from Table I B. A second layer 48 of another corrosion resistant austenitic stainless steel is metallurgically bonded to the first layer 46 along interface 50, the second layer being selected from the group consisting of austenitic stainless steels which undergo significant austenite to martensite transformation and concomitant lowering of thermal expansion during work hardening thereof. Typically for example, the material of layer 46 comprises 305 Stainless Steel selected from the materials of Table I B while the material of layer 48 comprises 301 Stainless Steel selected from the metals listed in Table III. The metal layers are metallurgically bonded to each other by pressure roll bonding or the like in any conventional manner so that the material of the metal layer 48 is placed in a selected condition of work-hardening for lowering its coefficient of thermal expansion to a selected level relatively lower than that of the metal layer 46. The metal layers 46 and 48 are made of selected relative thickness so that the flexivity of the thermostat metal 44 is determined by the relative thermal expansion properties of the metal layers 46 and 48 as will be understood. Preferably, where the metal layers 46 and 48 are formed of 305 and 301 Stainless Steels respectively, each comprises 50 percent of the total thickness of the composite material 44 and the metal layer is placed in work hardened condition corresponding to a 60 percent reduction in the thickness for providing the thermostat metal with a desired flexivity of about $55 \times 10^{-7}$ in./in./°F.

Figure 6:
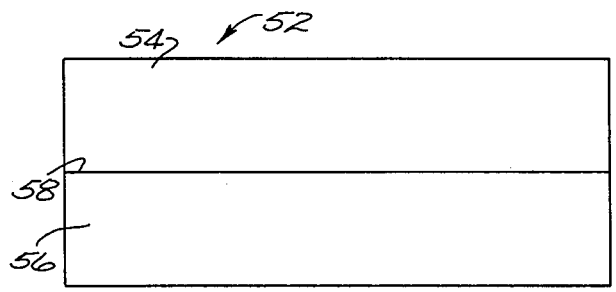

In another alternate embodiment of the invention as illustrated in FIG. 6, the composite thermostat metal 52 comprises a lateral type of bimetal having metal layers 54 and 56 respectively corresponding to metal layers 46 and 48 as previously described, the metal materials each being provided in the form of flat, elongated metal strips which are metallurgically bonded together along a strip edge interface 58 to form the lateral type bimetal as will be understood.

It should be understood that although particular embodiments of this invention have been described by way of illustrating the invention, the invention includes all modifications and equivilants of the disclosed embodiments falling within the scope of the appended claims.

I claim:

1. A composite thermostat metal adapted to flex when heated comprising first metal layer means having a relatively high coefficient of thermal expansion in a selected temperature range disposed at the high expansion side of the thermostat metal, and second metal layer means having a relatively lower coefficient of thermal expansion in said selected temperature range metallurgically bonded to the first metal layer means to be disposed at the low expansion side of the thermostat metal, the second metal layer means including at least one layer component of an austenitic stainless steel material disposed on an outer surface of the thermostat metal on the low expansion side thereof selected from the group consisting of austenitic stainless steels as set forth in Table III which are subject to significant austenite to martensite transformation during work hardening thereof, the stainless steel layer component having its coefficient of thermal expansion in said selected temperature range substantially lowered at least as low as $6.0 \times 10^{-6}$ in./in./°F. by work hardening thereof for cooperating in providing the thermostat metal with a suitably high flexivity of about $55 \times 10^{-7}$ in./in./°F. or more in said selected temperature range.

2. A composite thermostat metal comprising first metal layer means having a relatively high coefficient of thermal expansion in a selected temperature range disposed at the high expansion side of the thermostat metal, and second metal layer means having a relatively lower coefficient of thermal expansion in said selected temperature range metallurgically bonded to the first metal layer means to be disposed at the low expansion side of the thermostat metal, the second metal layer means including at least one layer component of an austenitic stainless steel material disposed on an outer surface of the thermostat metal on the low expansion side thereof selected from the group consisting of austenitic stainless steels as set forth in Table III which are subject to significant austenite to martensite transformation during work hardening thereof, the stainless steel layer component having its coefficient of thermal expansion in said selected temperature range substantially lowered by work hardening thereof for cooperating in providing the thermostat metal with a suitably high flexivity in said selected temperature range, the stainless steel layer material having a relatively small layer thickness comprising less than about 10 percent of the total thickness of the composite thermostat metal.

3. A composite thermostat metal as set forth in claim 1 wherein said selected temperature range is from about 50° to about 200° F.

4. A composite thermostat metal comprising first metal layer means having a relatively high coefficient of thermal expansion in a selected temperature range disposed at the high expansion side of the thermostat metal, and second metal layer means having a relatively lower coefficient of thermal expansion in said selected temperature range metallurgically bonded to the first metal layer means to be disposed at the low expansion side of the thermostat metal, the second metal layer means including at least one layer component of an austenitic stainless steel material disposed on an outer surface of the thermostat metal on the low expansion side thereof selected from the group consisting of austenitic stainless steels which are subject to significant austenite to martensite transformation during work hardening thereof, the stainless steel layer component having its coefficient of thermal expansion in said selected temperature range substantially lowered by work hardening thereof for cooperating in providing the thermostat metal with a suitably high flexivity in said selected temperature range, the second metal layer means embodying an additional layer component of a material selected from the group consisting of metals of relatively low coefficient of thermal expansion as set forth in Table II.

5. A composite thermostat metal as set forth in claim 1 wherein the first metal layer means embodies a layer component of a material selected from the group consisting of metals of relatively high coefficient of thermal expansion as set forth in Tables IA and IB.

6. A composite thermostat metal comprising a first metal layer of an austenitic stainless steel material having a relatively high coefficient of thermal expansion in a selected temperature range, said first metal layer material being selected from the group of austenitic stainless steel materials which are substantially free of austenite to martensite transformation during work hardening thereof, a second metal layer of a material having a relatively lower coefficient of thermal expansion having one side thereof metallurgically bonded to one side of the first metal layer, and a third metal layer of austenitic stainless steel material selected from the group consisting of austenitic stainless steels which are subject to significant austenite to martensite transformation and concomitant lowering of their coefficients of thermal expansion in said selected temperature range during work hardening thereof, the stainless steel layer being metallurgically bonded to an opposite side of the second metal layer and being in sufficiently work hardened condition for lowering its coefficient of thermal expansion in said selected temperature range to $6.0 \times 10^{-6}$ in./in./°F. to cooperate in providing the thermostat metal with a suitably high flexivity in said selected temperature range.

7. A composite thermostat metal as set forth in claim 6 wherein the first metal layer is selected from the group of materials as set forth in Table IB, the second metal layer material is selected from the group consisting of metals of relatively low coefficient of thermal expansion as set forth in Table II, and the third metal layer is selected from the group consisting of the materials as set forth in Table III.

8. A composite thermostat metal as set forth in claim 7 wherein the first metal material comprises 305 Stainless Steel the second metal layer comprises a nickel-iron alloy having a nominal composition by weight of 36 percent nickel and the balance iron, and the third metal layer comprises 301 Stainless Steel, the metal layers having thicknesses comprising 47.5 percent, 47.5 percent, and 5 percent respectively of the total thickness of the composite material.

9. A composite thermostat metal comprising a first metal layer of a material having a relatively high coefficient of thermal expansion in a selected temperature range, a second metal layer of an austenitic stainless steel material selected from the group of austenitic stainless steel materials which are substantially free of austenite to martensite transformation during work hardening thereof, the second metal layer being metallurgically bonded to one side of the first metal layer, a third metal layer of a material having a relatively low coefficient of thermal expansion in said selected temperature range having one side thereof metallurgically bonded to an opposite side of said first metal layer, and a fourth metal layer of a material selected from the group consisting of austenitic stainless steels which are subject to significant austenite to martensite transformation and concomitant lowering to their coefficients of thermal expansion in said selected temperature range during work hardening thereof, said fourth layer being metallurgically bonded to an opposite side of the third metal layer and being in sufficiently work hardened condition for lowering its coefficient of thermal expansion in said selected temperature range at least as low as $6.0 \times 10^{-6}$ in./in./°F. to cooperate in providing the thermostat metal with a suitably high flexivity in said selected temperature range.

10. A composite thermostat metal as set forth in claim 9 wherein the first metal layer is selected from the group consisting of materials of relatively high coefficient of thermal expansion as set forth in Table IA, the second metal layer material is selected from the group consisting of materials as set forth in Table IB, the third metal layer is formed of a material selected from the group consisting of metal materials of relatively low coefficient of thermal expansion as set forth in Table II, and the fourth metal layer is selected from the group consisting of metal materials as set forth in Table III.

11. A composite thermostat metal as set forth in claim 10 wherein the first metal layer embodies a metal material of relatively high coefficient of thermal expansion having a nominal composition by weight of about 22 percent nickel, 3 percent chromium, and the balance iron having a thickness comprising about 45 percent of the total thickness of the composite thermostat metal, the second metal layer embodies 305 Stainless Steel having a thickness comprising about 5 percent of the total thickness of the composite thermostat metal, the third metal layer embodies a metal material of relatively low coefficient of thermal expansion having a nominal composition by weight of about 36 percent nickel and the balance iron having a thickness comprising about 45 percent of the total thickness of the composite thermostat metal, and the fourth metal layer embodies 301 Stainless Steel having a thickness comprising about 5 percent of the total thickness of the composite thermostat metal.

12. A composite thermostat metal comprising a first metal layer and a second metal layer metallurgically bonded to the first metal layer, the first metal layer comprising a layer of metal of a material having a relatively high coefficient of thermal expansion in a selected temperature range and the second metal layer comprising a metal of a material having relatively lower coefficient of thermal expansion in said selected temperature range such that the first and second layers cooperate to form a thermostat metal having the first metal layer at the high expansion side thereof and having the second metal layer at the low expansion side an outer surface thereof, the second metal layer embodying an austenitic stainless steel material having the coefficient of thermal expansion thereof substantially lowered to at least $6.0 \times 10^{-6}$ in./in./°F. by work hardening of the stainless steel material for cooperating with the first metal layer to provide a flexivity of the thermostat metal of about $55 \times 10^{-7}$ in./in./°F. or more in said selected temperature range, the stainless steel material of the second layer being selected from the group consisting of the stainless steel materials as set forth in Table III.

13. A composite thermostat metal as set forth in claim 12 wherein the first metal layer embodies a material selected from the group consisting of metals of relatively high coefficient of thermal expansion as set forth in Tables IA and IB.

* * * * *